United States Patent
Shinohara

(10) Patent No.: US 7,259,532 B2
(45) Date of Patent: Aug. 21, 2007

(54) POWER WINDOW APPARATUS WITH FUNCTION OF PINCHING DETECTION

(75) Inventor: Akihiko Shinohara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 80 days.

(21) Appl. No.: 11/292,780

(22) Filed: Dec. 2, 2005

(65) Prior Publication Data

US 2006/0119301 A1 Jun. 8, 2006

(30) Foreign Application Priority Data

Dec. 2, 2004 (JP) .............................. 2004-349892
May 19, 2005 (JP) .............................. 2005-146969

(51) Int. Cl.
*H02P 1/00* (2006.01)

(52) U.S. Cl. ...................... 318/282; 318/285; 318/466; 318/469; 318/443; 318/444; 318/445

(58) Field of Classification Search ................ 318/285, 318/282, 466, 469, 443, 444, 445, 286
See application file for complete search history.

(56) References Cited

U.S. PATENT DOCUMENTS

2004/0138843 A1* 7/2004 Bouamra et al. ............. 702/94

FOREIGN PATENT DOCUMENTS

JP H7-113375 5/1995

* cited by examiner

*Primary Examiner*—Karen Masih
(74) *Attorney, Agent, or Firm*—Brinks Hofer Gilson & Lione

(57) ABSTRACT

An MCU monitors changes in motor rotating speed from the motor start so as to detect a peak of the motor rotating speed, and when the peak of the motor rotating speed is detected, it measures a period of time Ta from the motor start to the time, at which the decreasing rate of the motor rotating speed becomes maximal, so as to establish the activation/cancellation time period by adding a time Tb that is a predetermined numerical-fold door vibration period to the time Ta. When a second peak with more than a predetermined amount of the motor rotating speed is detected after the first peak detection, the activation/cancellation time period is established by adding a time Tb1 that is a predetermined numerical-fold door vibration period to the activation/cancellation time period obtained before.

6 Claims, 10 Drawing Sheets

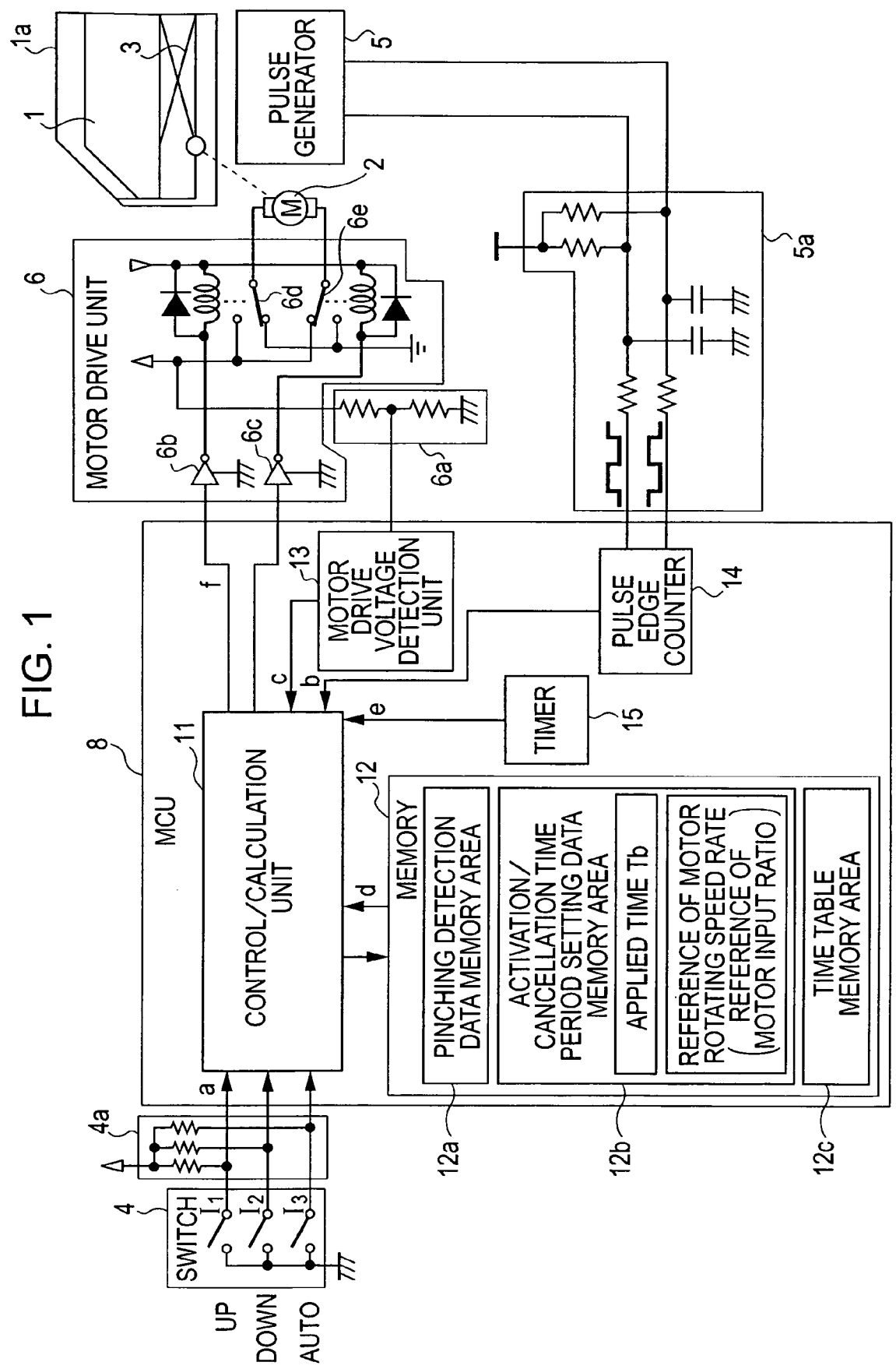

POWER WINDOW APPARATUS WITH FUNCTION OF PINCHING DETECTION

BACKGROUND OF THE INVENTION

1. Field of the Invention

The present invention relates to a power window apparatus with a function of pinching detection, and in particular it relates to improving means for further improving the reliability of foreign substance pinching detection by setting an activation/cancellation time period in which the pinching detection is not executed in accordance with the presence of a backlash in a motor for lifting/lowering a window or in a window drive mechanism connecting between the window and the motor.

2. Description of the Related Art

There has been a proposed power window apparatus having a pinching detection function to avoid the pinching by stopping or reversing motor drive when a foreign substance is pinched during window lifting by the motor drive as well as, in order to take a corrective action for a backlash of the drive mechanism, having a pulse encoder for generating a pulse signal corresponding to the rotation of the motor, monitoring means for monitoring the rotating speed of the motor using the output pulse from the pulse encoder during the lifting of the window, pinch recognizing means for recognizing the pinching when the relative reduction in motor revolution exceeds a predetermined determination reference during the lifting of the window, and determination reference changing means for increasing the predetermined determination reference for duration of a predetermined rotating speed since the lifting start of the window after lowering (see Japanese Unexamined Patent Application Publication No. H07-113375).

In this power window apparatus with the pinching detection function, the value of the pinching determination reference for duration of a predetermined rotating speed since the lifting start of the window after lowering is increased by the determination reference changing means, so that the phenomena, in which at the initial lifting of the window after the inversion from the lowering, the rotating motor speed is stably lowered after the high-speed rotation with nearly no-load due to the backlash of the drive system of the window by the motor, is difficult to be misconceived as pinching generation. As this apparatus does not prohibit the pinching determination also during the increasing the pinching determination reference, the pinching prevention can be functioned.

In addition to the above mentioned technique, a power window apparatus with a pinching detection function has also been proposed in that during a predetermined period from the motor start up to the stabilized point of the motor rotation, the pinching is not determined as an activation/cancellation time period.

The size in backlash of a drive mechanism is different for every vehicle due to accuracies in manufacturing of the window drive mechanism with the motor and assembling in the vehicle, and it changes with time. Furthermore, when the window is inverted from the lowering to the lifting, the backlash is large, and when it is lifted again after the lifting, the backlash is small.

In the technique disclosed in Japanese Unexamined Patent Application Publication No. H07-113375, the value of the pinching determination reference for duration of a predetermined rotating speed since the lifting start of the window is increased, wherein "the duration of a predetermined rotation speed" is a period predetermined for each power window apparatus and "the determination reference" is a fixed value selected from values ranging 1.5 to 4 times as long as a normal determination reference. As mentioned above, since there are variations in size of the backlash for each vehicle, "the duration of a predetermined rotation speed" and "the determination reference" have to correspond to the upper limit of the backlash distribution. Accordingly, "the duration of a predetermined rotation speed" may be a considerable long period and "the determination reference" must be a very large value. As a result, although the pinching can be determined directly after the door glass inversion, its reliability is low and the duration is long. In this conventional technique, only in the door glass inversion from lowering to the lifting, the corrective action is uniformly taken; however, there may be cases where the backlash is small in the inversion from lowering to the lifting or the backlash is large when the door glass is again lifted after lifting.

Also, in the power window apparatus with the pinching detection function in that during a predetermined period from the motor start up to the stabilized point of the motor rotation, the pinching is not determined as an activation/cancellation time period, there is also a problem of the long activation/cancellation time period.

When a drive system for elevating a window has a backlash with a size of more than a predetermined value, if the window is lifted after lowering, the motor is rotated at a high speed with nearly no-load, and then the motor rotation speed is stabilized with the starting of the drive system, and as shown in FIG. 11A, the motor rotation speed has a peak value after the motor starting. A time T1 from the motor starting to the peak changes with the backlash size while a time T2 from the peak to a stabilized point P is scarcely affected by the backlash size and does not vary widely, so that the time T2 can be obtained in advance with an experiment or a simulation. Accordingly, when an activation/cancellation time period T is established by the value obtained by adding the time T2 obtained with the experiment or the simulation to the detected time T1, the activation/cancellation time period can be optimized in accordance with the backlash included in the drive system so as to eliminate the above-mentioned inconvenience.

However, when an elastic modulus of the door including a damper in a motor 2 is large, the motor rotating speed does not have a waveform as shown in FIG. 11A, but has a shape having a plurality of peaks as shown in FIG. 11B (two in the example shown in FIG. 11B). In such a shape having a plurality of peaks, the activation/cancellation time period T cannot be optimized by simply adding the time T1 to the time T2 in the case of one peak, so that the reduction in motor rotating speed due to the door vibration may be misconceived as the pinching. In the above-description, the detection of the changes in motor rotating speed has been exemplified; alternatively, when the activation/cancellation time period T is established by detecting a window lifting force applied to the motor, the same inconvenience occurs. The inventors of this application have learned these facts from the researches.

When the window is ill-fitted to a window frame of the door, a clearance is produced between the window and its drive system during vibration of the window in multi-directions so that the motor rotates at high-speed with nearly no-load so as to form a shape with a plurality of peaks in the same way as mentioned above and shown in FIG. 11B. Moreover, it is understood that the difference between the plurality of peaks is small as shown in FIG. 8.

SUMMARY OF THE INVENTION

The present invention has been made on the basis of such findings, and it is an object thereof to provide a power window apparatus with a pinching detection function capable of determining the pinching of a foreign substance more accurately by optimizing an activation/cancellation time period, even when a drive system for elevating the window has a backlash while changes in motor rotating speed or window elevating force have a shape with a plurality of peaks.

In order to solve the above problems, a power window apparatus with a function of pinching detection according to a first aspect of the present invention includes a motor for opening/closing a window via a window drive mechanism during driving; a pulse generator outputting a pulse signal in accordance with the rotation of the motor; a switch unit for manually opening/closing the window by generating a switch signal; and a control unit for producing a control signal of the motor corresponding to the pulse signal and the switch signal, and the power window apparatus with a function of pinching detection executes determination whether pinching is generated in the window when the window is closed by the switch unit; a pinch avoiding procedure when the pinching is determined using the control unit; and no pinching determination in the period from a motor start to a stabilized point of the motor rotating speed assumed as an activation/cancellation time period, in which the control unit monitors changes in motor rotating speed from the motor start so as to detect a peak of the motor rotating speed, and when the peak of the motor rotating speed is detected, the control unit measures a period of time Ta, through which the decreasing rate of the motor rotating speed becomes maximal after the peak detection from the motor start, so as to establish the activation/cancellation time period by adding a time Tb that is a first predetermined numerical-fold door vibration period to the time Ta, and when the peak of the motor rotating speed is not detected, the time that the changing rate of the motor rotating speed arrives at a predetermined value or an input ratio of the motor arrives at a predetermined value is assumed to be the finish time of the activation/cancellation time period.

In a power window apparatus with a function of pinching detection according to a second aspect of the present invention having the same structure as that of the power window apparatus with a function of pinching detection according to the first aspect of the present invention, the control unit monitors a window lifting force applied to the motor from the motor start so as to detect a peak of the window lifting force, and when the peak of the window lifting force is detected, the control unit measures a period of time Ta, through which the decreasing rate of the window lifting force becomes maximal after the peak detection from the motor start, so as to establish the activation/cancellation time period by adding a time Tb that is a first predetermined numerical-fold door vibration period to the time Ta, and when the peak of the window lifting force is not detected, the time that the changing rate of the window lifting force arrives at a predetermined value or an input ratio of the motor arrives at a predetermined value is assumed to be the finish time of the activation/cancellation time period.

In a power window apparatus with a function of pinching detection according to a third aspect of the present invention having the same structure as that of the power window apparatus with a function of pinching detection according to the first aspect of the present invention, the control unit monitors changes in motor rotating speed from the motor start so as to detect a peak of the motor rotating speed, and when the peak of the motor rotating speed is detected, the control unit measures a period of time Ta, through which the decreasing rate of the motor rotating speed becomes maximal after the peak detection from the motor start, so as to establish the activation/cancellation time period by adding a time Tb that is a first predetermined numerical-fold door vibration period to the time Ta, and when a second peak with more than a predetermined amount of the motor rotating speed is detected thereafter, the activation/cancellation time period is established by adding a time Tb1 that is a second predetermined numerical-fold door vibration period to the activation/cancellation time period obtained before.

In a power window apparatus with a function of pinching detection according to a fourth aspect of the present invention having the same structure as that of the power window apparatus with a function of pinching detection according to the first aspect of the present invention, the control unit monitors changes in motor rotating speed from the motor start so as to detect a peak of the motor rotating speed, and when the peak of the motor rotating speed is detected, the control unit measures a period of time Ta, through which the decreasing rate of the motor rotating speed becomes maximal after the peak detection from the motor start, so as to establish the activation/cancellation time period by adding a time Tb that is a first predetermined numerical-fold door vibration period to the time Ta, and when a second peak with more than a predetermined amount of the motor rotating speed is detected thereafter, a period of time Tb2 from the time, at which the motor rotating speed is minimized in between the first and second peaks, to the time arriving at the second peak is obtained, so that the activation/cancellation time period is established by adding the time Tb2 to the activation/cancellation time period obtained before.

In a power window apparatus with a function of pinching detection according to a fifth aspect of the present invention having the same structure as that of the power window apparatus with a function of pinching detection according to the first aspect of the present invention, the control unit monitors changes in window lifting force applied to the motor from the motor start so as to detect a peak of the window lifting force, and when the peak of the window lifting force is detected, the control unit measures a period of time Ta, through which the decreasing rate of the window lifting force becomes maximal after the peak detection from the motor start, so as to establish the activation/cancellation time period by adding a time Tb that is a first predetermined numerical-fold door vibration period to the time Ta, and when a second peak with more than a predetermined amount of the window lifting force is detected thereafter, the activation/cancellation time period is established by adding a time Tb1 that is a second predetermined numerical-fold door vibration period to the activation/cancellation time period obtained before.

In a power window apparatus with a function of pinching detection according to a sixth aspect of the present invention having the same structure as that of the power window apparatus with a function of pinching detection according to the first aspect of the present invention, the control unit monitors changes in window lifting force applied to the motor from the motor start so as to detect a peak of the window lifting force, and when the peak of the window lifting force is detected, the control unit measures a period of time Ta, through which the decreasing rate of the window lifting force becomes maximal after the peak detection from the motor start, so as to establish the activation/cancellation time period by adding a time Tb that is a first predetermined numerical-fold door vibration period to the time Ta, and when a second peak with more than a predetermined amount of the window lifting force is detected thereafter, a period of time Tb2 from the time, at which the motor rotating speed is minimized in between the first and second peaks, to the time arriving at the second peak is obtained, so that the activation/cancellation time period is established by adding the time Tb2 to the activation/cancellation time period obtained before.

According to experiments and simulation, when the window drive system has a backlash with more than a predetermined value, other than the peak due to the backlash, as shown in FIG. 11B, one peak of the motor rotating speed or one peak of the door lifting force is generally generated by the door vibration, and its period agrees with the period of the door vibration. The period of time from a time A, at which the decreasing rate of the motor rotating speed or the window lifting force becomes maximal, to a time arriving at a stabilized point P of the motor rotating speed or the window lifting force is equivalent to about 1.25 periods of the door vibration. Hence, a period of time Ta from the motor start to the time, at which the decreasing rate of the motor rotating speed becomes maximal when the first peak of the motor rotating speed is detected, is measured, so that the activation/cancellation time period T is established by adding a time Tb that is about 1.25 periods of the door vibration to the time Ta, thereby optimizing the activation/cancellation time period T regardless of waveforms of the motor rotating speed or the window lifting force so as to more improve the reliability of the power window apparatus with a function of pinching detection. The vibration period is specifically the time for the second peak, i.e., a period of time from the time, at which the decreasing rate of the motor rotating speed becomes 0 in between the first and second peaks, to the stabilized time of the motor rotating speed after the second peak. We found experimentally that this period depends less on the height of the second peak, and this period is measured by experiments so as to statistically determine it.

In the case where the window drive system has a backlash with more than a predetermined amount and the window is ill-fitted to the window frame of the door, when the window is lifted after it is lowered and the window is laterally swung, the motor also rotates at high speed with almost no load as mentioned above. Then, since the load due to the window lifting is applied, a plurality of peaks (two peaks, generally) of the motor rotating speed and the window lifting force are generated. In this case, different from the peak due to the door vibration, the difference between the first and second peaks of the motor rotating speed or the window lifting force is small. Moreover, when the difference is up to 10%, at the 1.25 periods of the vibration, the motor rotating speed is not stabilized. It is understood that at a predetermined numeric fold of the door vibration period, specifically 0.5 periods, the extension of the time arriving at the stabilized point is affected. It is also understood that this effect is slightly shorter than the period of time from the time, at which the motor rotating speed or the window lifting force is minimized in between the first and second peaks, to the second peak. Accordingly, when the second peak is more than a predetermined amount, the activation/cancellation time period T is set by adding Tb1 or Tb2 to the basic activation/cancellation time period T so as to optimize the activation/cancellation time period T, more improving the reliability of the power window apparatus with the pinching detection function.

On the other hand, when the window drive system has no backlash, as shown in FIG. 7, the motor rotating speed gradually increases from the motor start, and the increasing rate is decreased as the time proceeds so as to be stabilized to have a predetermined value after an elapsed time from the motor start. The motor input ratio (the ratio Rin of the primary lagging value (correction voltage) Vout1 of the input voltage Vin relative to the input voltage Vin, Rin=Vout1/Vin), as shown in FIGS. 9 and 10, gradually increases from the motor start, regardless of the presence of the backlash with more than a predetermined amount of the window drive system, and the increasing rate decreases as the time proceeds so as to be stabilized to have a predetermined value after an elapsed time from the motor start. Thus, when the window drive system has no backlash with more than a predetermined value, the time, at which the changing rate of the motor rotating speed (the rate of the measured motor rotating speed relative to the motor rotating speed at the stabilized point P) or the motor input ratio arrives at a desired value (97%, for example), is assumed to the time at which the motor rotating speed or the motor input ratio arrives at the stabilized point p. Hence, the time, at which the changing rate of the motor rotating speed or the motor input ratio arrives at a predetermined value, is assumed to the finish time of the activation/cancellation time period so as to more improve the reliability of the power window apparatus with the pinching detection function.

In the power window apparatus with the pinching detection function according to the present invention, the control unit monitors changes in motor rotating speed or window lifting force so as to detect the peak of the motor rotating speed or the window lifting force. When the peak of the motor rotating speed or the window lifting force is detected, a period of time Ta from the motor start to the time the decreasing rate of the motor rotating speed or the window lifting force becomes maximal after the peak detection is measured, so that the finish time of the activation/cancellation time period T is established by adding a time Tb that is about 1.25 periods of the door vibration to the time Ta, thereby optimizing the activation/cancellation time period T regardless of waveforms of the motor rotating speed or the window lifting force so as to prevent the inappropriate setting of the activation/cancellation time period.

Also, in the power window apparatus with the pinching detection function according to the present invention, when the peak of the motor rotating speed or the window lifting force is detected, a period of time Ta from the motor start to the time the decreasing rate of the motor rotating speed or the window lifting force becomes maximal after the peak detection is measured, so that the activation/cancellation time period T is established by adding a time Tb that is a predetermined numerical-fold of the door vibration period to the time Ta. When a second peak with more than a predetermined amount of the motor rotating speed or the window lifting force is detected thereafter, the activation/cancellation time period is established by adding a time Tb1 that is a predetermined numerical-fold door vibration period to the activation/cancellation time period obtained before, or a period of time Tb2 from the time, at which the motor rotating speed or the window lifting force is minimized in between the first and second peaks, to the time arriving at the second peak is obtained, so that the activation/cancellation time period is established by adding the time Tb2 to the activation/cancellation time period obtained before, thereby optimizing the setting of the activation/cancellation time period T regardless of the window ill-fitting to the window frame so as to more improve the reliability of the power window apparatus with the pinching detection function.

Embodiments of a power window apparatus with a pinching detection function according to the present invention will be described with reference to FIGS. 1 to 12.

BRIEF DESCRIPTION OF FIGURES

FIG. 1 is a structural drawing of a power window apparatus with a pinching detection function according to a first embodiment;

As shown in FIG. 1, a power window apparatus with a pinching detection function according to the embodiment principally includes a window 1, a motor 2 for elevating the window 1, a window drive mechanism 3 for connecting the window 1 and the motor 2, a switch unit 4 for switching the driving direction and the driving mode of the motor 2, a pull-up resistor 4a, a pulse generator 5 for detecting the rotational state of the motor 2, a pulse transmission path 5a, a motor drive unit 6 for applying a required drive voltage to the motor 2, a resistor divider 6a, and a micro-control unit 8 for controlling the rotation of the motor 2 via the motor drive unit 6 by generating a control signal of the motor 2 on the basis of a switch signal output from the switch unit 4 and a pulse signal output from the pulse generator 5 as well as for establishing an activation/cancellation time period on the basis of the pulse signal and an input ratio of the motor 2. In this specification, a system composed of the motor 2 and the window drive mechanism 3 is referred to as a widow drive system or a drive system.

DESCRIPTION OF THE PREFERRED EMBODIMENTS

The window 1 is attached to a door of a vehicle movably up and down, and is moved up and down via the window drive mechanism 3 by the motor 2. The window drive mechanism 3 is composed of a power transmission mechanism including a rack/pinion mechanism, a wire mechanism wound around a wire reel, or a combination thereof so as to securely transmit the drive power of the motor 2 to the window 1. The motor 2 is connected to a movable part of the window drive mechanism 3.

The switch unit 4 is arranged in an internal surface of the door including three switches (not shown) of a switch for instructing the lifting of the window 1, a switch for instructing the lowering of the window 1, and a switch for instructing the automatic continuous operation. When the switch for instructing the lifting of the window 1 or the switch for instructing the lowering of the window 1 is independently operated, the window 1 is lifted or lowered only during the operation of the switch while when the operation is stopped, the lifting or the lowering of the window 1 is also stopped. Whereas, when the switch for instructing the lifting of the window 1 and the switch for instructing the automatic continuous operation are simultaneously operated, the lifting of the window 1 is continued even after the operation of the switch for instructing the lifting the window 1 is stopped, so that the window 1 is stopped when arriving at the highest part of the window frame. Also, when the switch for instructing the lowering of the window 1 and the switch for instructing the automatic continuous operation are simultaneously operated, the lowering of the window 1 is continued even after the operation of the switch for instructing the lowering the window 1 is stopped, so that the window 1 is stopped when arriving at the lowest part of the window frame.

Figure 2A:
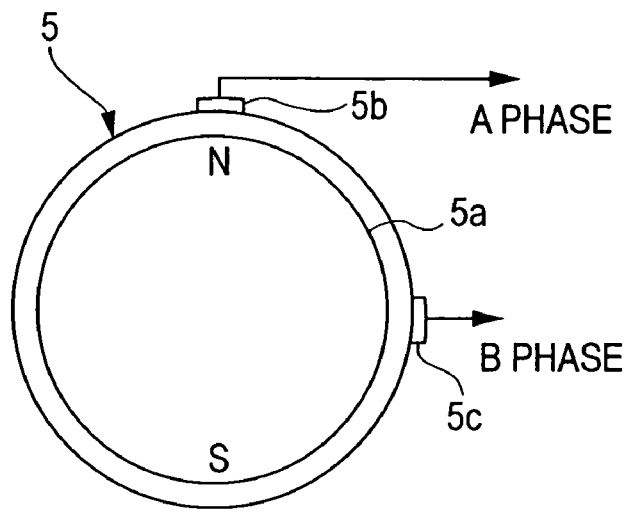
FIGS. 2A and 2B are explanatory drawings illustrating the structure of a pulse generator and waveforms of pulse signals output from the pulse generator.
Figure 2B:
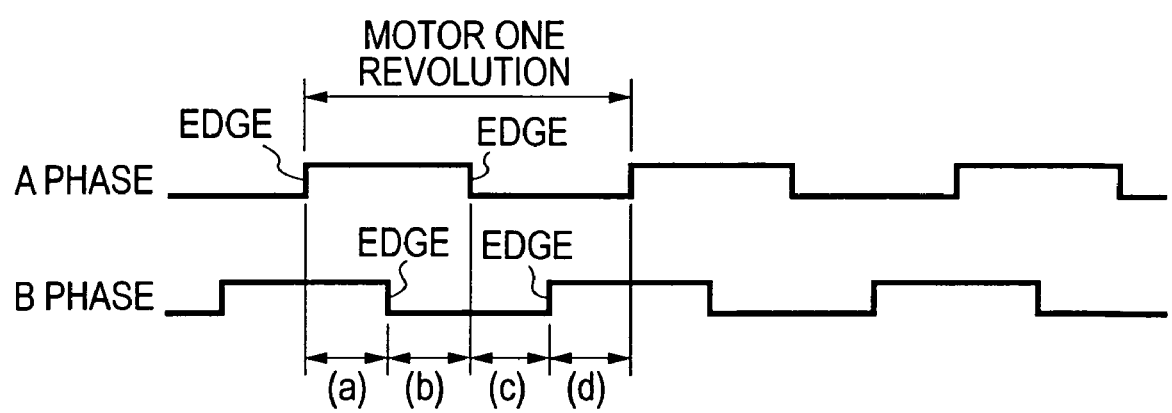

The pulse generator 5, as shown in FIG. 2A, includes a body of revolution 5a showing a magnetic property and rotated by the motor 2 and two Hall elements 5b and 5c arranged along the periphery of the body of revolution 5a and spaced at 90°. As shown in FIG. 2B, the Hall elements 5b and 5c output square wave pulses with two-phase shifted by 90°.

The motor drive unit 6 includes two inverters 6b and 6c for inverting control signals and two relays 6d and 6e for switching between normal rotation, reverse rotation, and stop of the motor 2 so as to rotate the motor 2 in accordance with control signals supplied from an MCU 8.

The MCU 8, as shown in FIG. 1, includes a control/calculation unit 11, a memory 12, a motor drive voltage detection unit 13, a pulse edge counter 14 and a timer 15.

The memory 12 is divided into a pinching detection data memory area 12a storing factors and computing equations required for the pinching detection executed in the control/calculation unit 11, an activation/cancellation time period setting data memory area 12b storing factors and computing equations required for the activation/cancellation time period executed in the control/calculation unit 11 to be set, and a time table memory area 12c storing operational procedures of the control/calculation unit 11. In the activation/cancellation time period setting data memory area 12b, there are an applied time Tb when the drive system of the window 1 has a backlash and a reference of motor rotating speed rate or a reference of motor input ratio required for the activation/cancellation time period to be completed when the drive system of the window 1 has no backlash, which are stored therein. The applied time Tb is 1.25 times as large as the vibration period of the door, and the vibration period of the door is obtained by an experiment or a simulation in advance. The reference of motor rotating speed rate or the reference of motor input ratio is also obtained by an experiment or a simulation in advance.

The motor drive voltage detection unit 13 detects the motor drive voltage, and the pulse edge counter 14 detects pulse edges of the two-phase square wave pulse supplied from the pulse generator 5. The timer 15 applies clocking required for necessary data processing and data computation to the control/calculation unit 11.

The control/calculation unit 11 takes in a switch signal a input from the switch unit 4, a switch signal b input via the pulse edge counter 14 from the pulse generator 5, a drive voltage signal c input via the motor drive voltage detection unit 13 from the motor drive unit 6, and a data signal d input from the memory 12, and a timer signal e input from the timer 15 so as to feed a control signal f to the motor drive unit 6 in accordance with an operational state of the switch unit 4 and the presence of pinching by processing and calculating necessary data for controlling the start, stop, reverse of the motor 2. The control/calculation unit 11 determines the presence of the pinching on the basis of the above-mentioned signals a to e as well as establishes an activation/cancellation time period, in which the presence of the pinching is not determined. The input voltage necessary for calculating the motor input ratio is obtained from the drive voltage signal c, and the control/calculation unit 11 calculates the input voltage and the motor input ratio.

Figure 3:
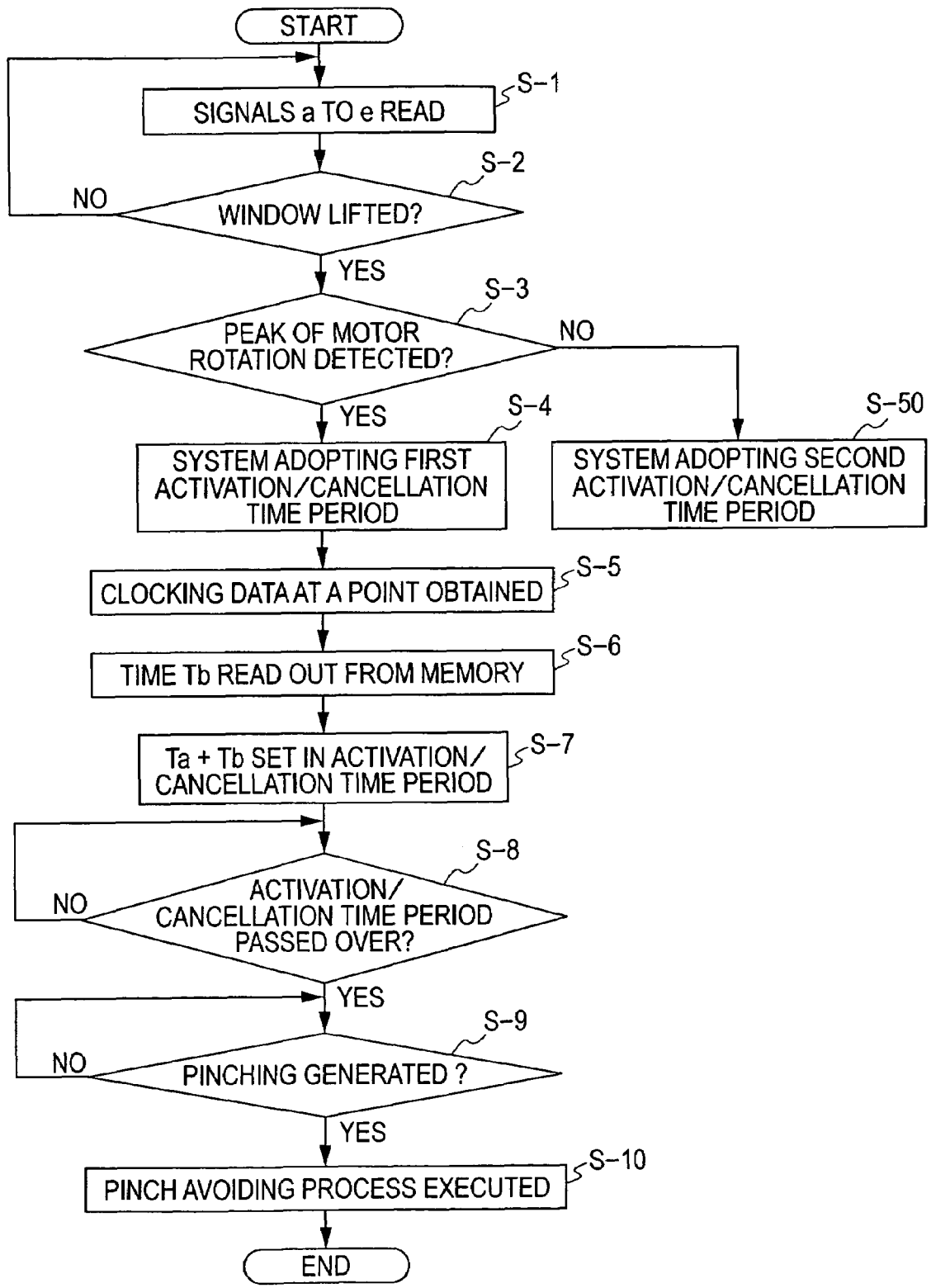
FIGS. 3 and 4 are flowcharts showing a basic operation process of the power window apparatus with the pinching detection function according to the first embodiment.

That is, the control/calculation unit 11 controls the entire system, and as shown in FIG. 3, when the switch unit 4 is operated, it reads the signals a to e (Step S-1) so as to determine whether the window 1 is instructed to lift (Step S-2). At Step S-2, if the lifting instruction of the window 1 is determined, the peak of the motor rotating speed is detected (Step S-3). At Step S-3, if the peak of the motor rotating speed is detected, a first cancellation time period system is adopted (Step S-4). The control/calculation unit 11 obtains clocking data Ta at A point where the decreasing rate of the motor rotating speed is maximal since the motor start (Step S-5). Then, an applied time Tb is read out of an activation/cancellation time period setting data memory area 12b (Step S-6). By adding time Ta to time Tb, the value Ta+Tb is set as an activation/cancellation time period T (Step S-7). The detection of the A point where the decreasing rate of the motor rotating speed is maximal at Step S-5 is determined by monitoring changes of the motor rotating speed so as to have the maximal point where the decreasing rate of the motor rotating speed is maximal after the peak detection.

After setting the activation/cancellation time period, the control/calculation unit 11 determines whether pinching is generated in the window 1 (Step S-9) after the completion of the activation/cancellation time period (Step S-8). If the pinching generation is determined at Step S-9, the required pinch avoiding procedure, such as motor stopping or widow lowering, is executed (Step S-10), and the system is completed after finishing the required pinch avoiding procedure. The determination of the pinching at Step S-9 may employ the method proposed in Japanese Unexamined Patent Application Publication No. H11-81793 assigned to the same assignee as this application.

Figure 5:
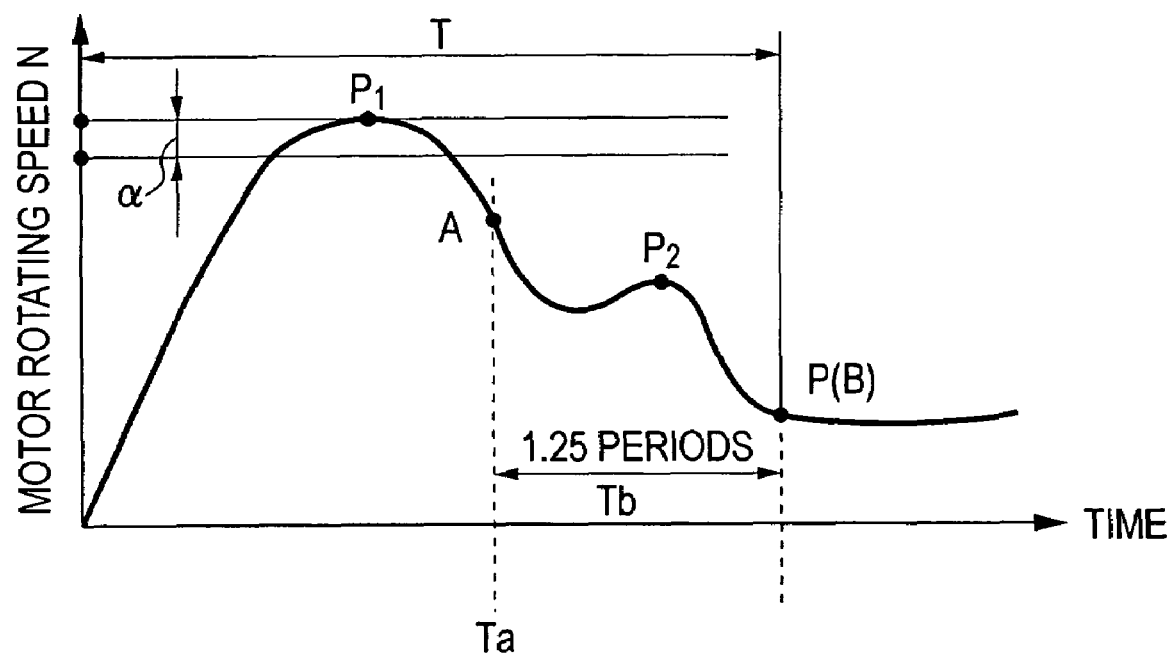
FIG. 5 is a graph showing the effect of the power window apparatus with the pinching detection function according to the first embodiment.

Since the period from the A point where the decreasing rate of the motor rotating speed is maximal to the stabilized point P of the motor rotating speed or the widow lifting force is confirmed by experiments to be equivalent to 1.25 periods of the door vibration, by setting the activation/cancellation time period T, in the power widow apparatus with the pinching detection function according to the embodiment, as shown in FIG. 5, a finish time B of the activation/cancellation time period T can agree with the stabilized point P of the motor rotating speed regardless of changes in the motor rotating speed, thereby improving the reliability of the apparatus. In addition, the door vibration period is different depending on the structure of the door, and in a general door, the experimental result shows 50 ms. FIG. 5 shows the activation/cancellation time period in the case where the second peak cannot be detected or being less than a predetermined value (within an allowance a of the motor rotating speed change at the first peak P1). The activation/cancellation time period T is set to be the time obtained by adding the time at the A point, i.e., a time Ta where the decreasing rate of the motor rotating speed is maximal to a time Tb i.e., 1.25 periods of the door vibration. The small peak in the drawing shows the peak due to the door vibration.

If the peak of the motor rotating speed is not detected at Step s-3, a second cancellation time period system is adopted (Step S-50). The control/calculation unit 11 reads the motor input ratio out of the activation/cancellation time period setting data memory area 12b of the memory 12 (Step S-51) while calculating the motor input ratio by taking in the drive voltage signal c input from the motor drive unit 6 via the motor drive voltage detection unit 13 (Step S-52). Then, the control/calculation unit 11 determines whether the calculated motor input ratio reaches the reference C of the motor input ratio stored in the activation/cancellation time period setting data memory area 12b of the memory 12, and the time arriving at the reference C of the motor input ratio is set to be the finish time B of the activation/cancellation time period T (Step S-53). The pinching detection at Step S-54 and Step S-55 is the same as that at Step S-8 and Step S-9, so that the description is omitted.

In such a manner, in the power window apparatus with the pinching detection function according to the embodiment, when the peak of the motor rotational speed is not detected (the case where the drive system of the window 1 has not a backlash with more than a predetermined amount), the time that the motor input ratio arrives at a required value (97%, for example) is assumed to be the stabilized point of the motor rotation as the finish time of the activation/cancellation time period T, preventing the activation/cancellation time period from being inappropriately set at the motor start and more improving the reliability of the power window apparatus with the pinching detection function.

Next, a second embodiment of the present invention will be described. According to the first embodiment, the peak of the motor rotating speed is detected by detecting the motor rotating speed; whereas the second embodiment is characterized by detecting the widow lifting force applied to the motor so as to detect the peak. Since other procedures are the same as those of the first embodiment, only "the widow lifting force" is substituted for "the motor rotating speed" in the description of the first embodiment, so that the structural drawing and the procedure drawing are omitted. The window lifting force is obtained by multiplying the torque generated by the motor when the widow is lifting by the transmission factor of a power widow regulator. The torque of the motor can be obtained by calculating the voltage applied to the motor and the motor rotating speed using a motor factor (a motor characteristic value).

According to the first embodiment, when the drive system of the window 1 has not a backlash with more than a predetermined amount, the time that the motor input ratio arrives at a required value (97%, for example) is assumed to be the stabilized point of the motor rotation as the finish time of the activation/cancellation time period T; however, the sprit of the present invention is not limited to this, so that instead of such a structure, when the drive system of the window 1 has no backlash, the time that the motor rotating speed rate arrives at a required value (97%, for example) may be assumed to be the stabilized point of the motor rotation as the finish time of the activation/cancellation time period T.

Figure 6:
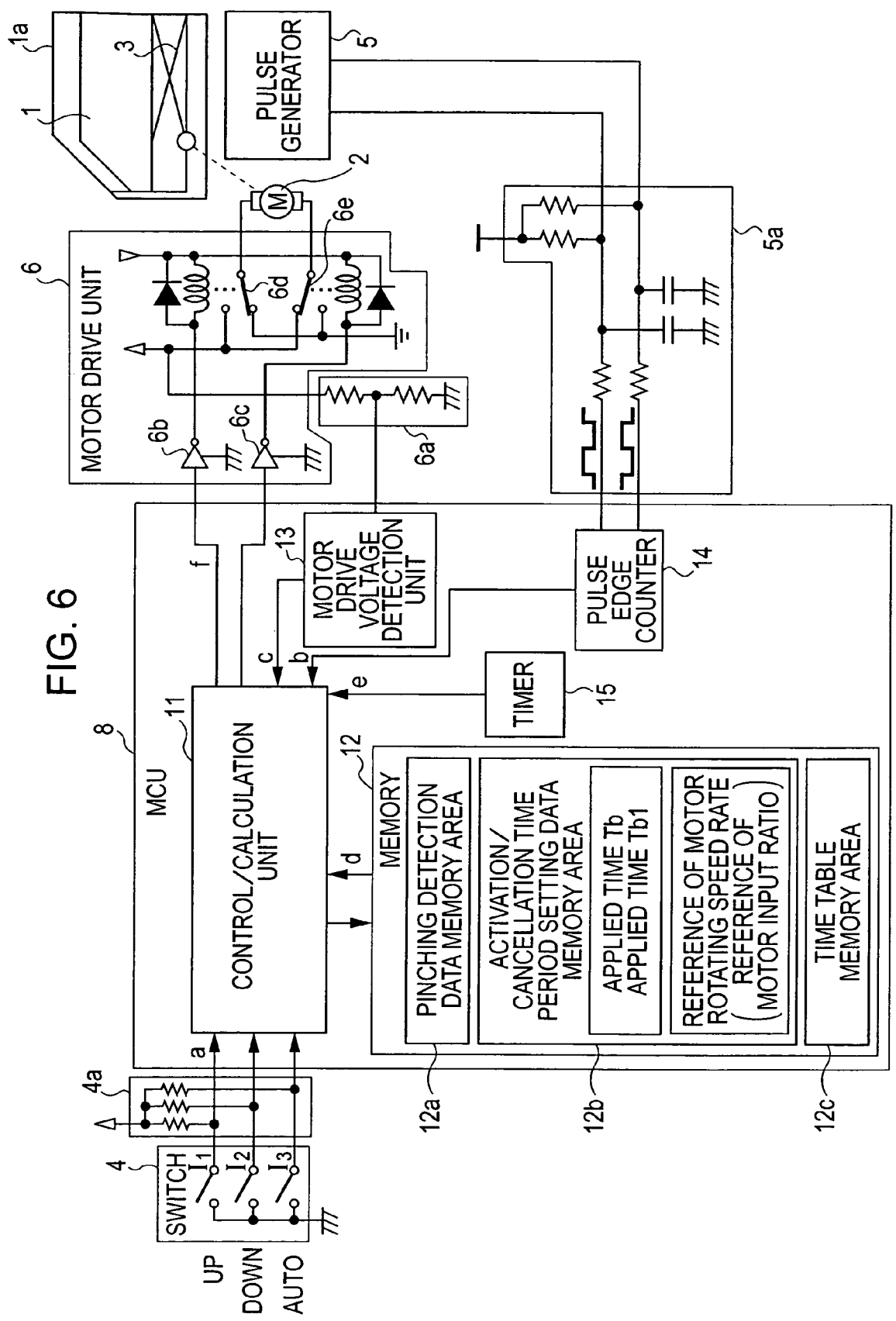
FIG. 6 is a structural drawing of a power window apparatus with a pinching detection function according to a second embodiment.

Next, a third embodiment will be described. A power window apparatus with a pinching detection function according to the third embodiment and shown in FIG. 6 is almost the same as that according to the first embodiment, so that like reference numerals designate like components common to the first embodiment. The point of the third embodiment that differs from the first embodiment is that in the activation/cancellation time period setting data memory area 12b of the memory 12, an applied time Tb1 is stored in addition to the applied time Tb when the drive system of the window 1 has a backlash and the motor rotating speed has a peak. The applied time Tb is assumed to be 1.25 times as long as the vibration period of the door and the applied time Tb1 is 0.5 times as long as the vibration period of the door, and the vibration period of the door is obtained by experiments or simulation in advance.

Figure 7:
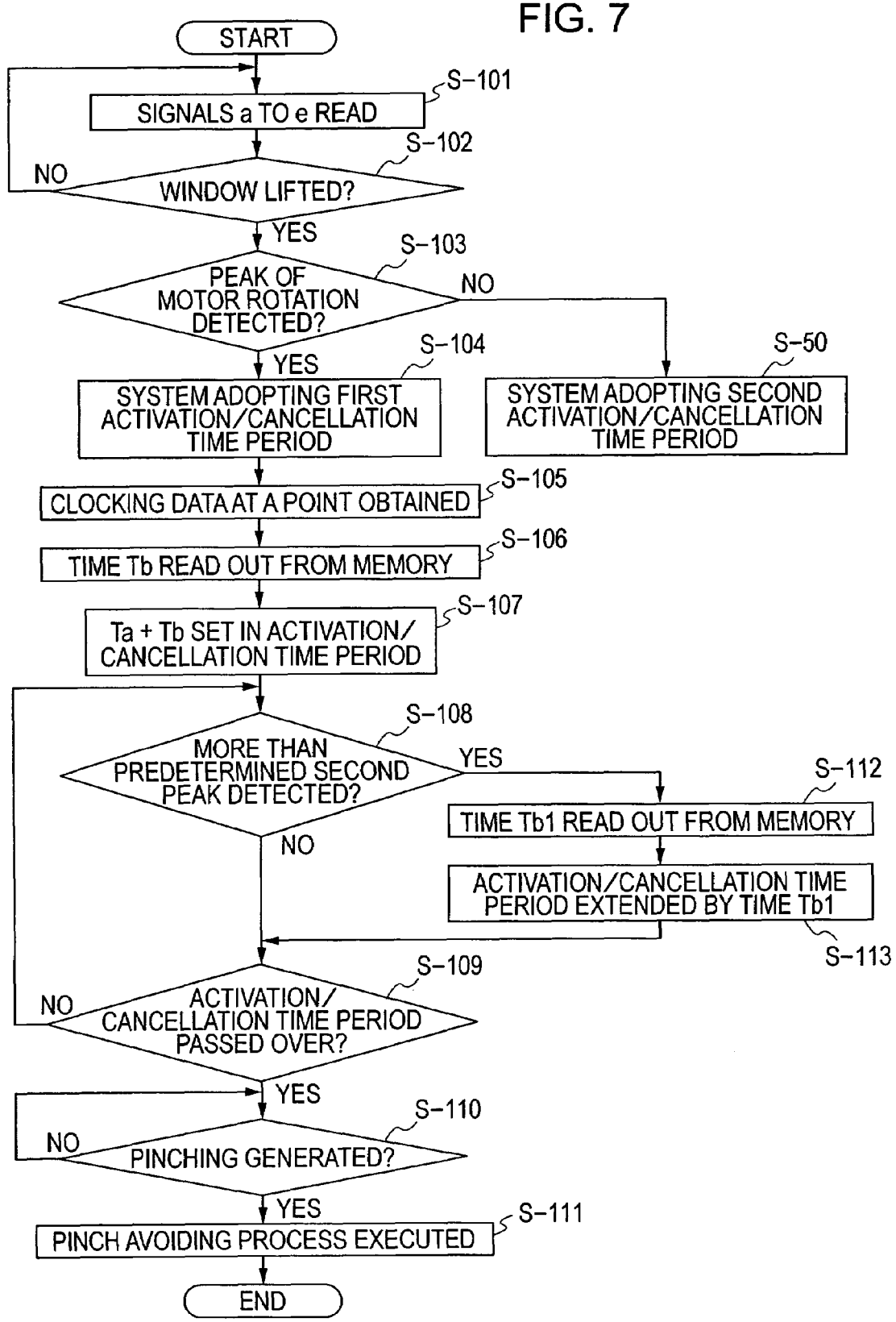
FIG. 7 is a flowchart showing a basic operation process of a power window apparatus with a pinching detection function according to a third embodiment.

The control procedure of the power window apparatus with the pinching detection function according to the third embodiment is shown in FIG. 7. That is, the control/calculation unit 11 controls the entire system, and when the switch unit 4 is operated, it reads the signals a to e (Step S-101) so as to determine whether the window 1 is instructed to lift (Step S-102). At Step S-102, if the lifting instruction of the window 1 is determined, the peak of the motor rotating speed is detected (Step S-103).

At Step S-103, if the peak of the motor rotating speed is detected, the first cancellation time period system is adopted (Step S-104). The control/calculation unit 11 obtains clocking data Ta at A point where the decreasing rate of the motor rotating speed is maximal since the motor start (Step S-105). Then, an applied time Tb is read out of an activation/cancellation time period setting data memory area 12b (Step S-106). By adding time Ta to time Tb, the value Ta+Tb is set as a finish time P of the activation/cancellation time period (Step S-107). The detection of the A point where the decreasing rate of the motor rotating speed is maximal at Step S-105 is determined by monitoring changes of the motor rotating speed so as to have the maximal point where the decreasing rate of the motor rotating speed is maximal after the peak detection.

After Step S-107, the peak detection of the motor rotating speed is continued (Step S-108) and the monitoring of the passage of the activation/cancellation time period is continued (Step S-109). Before the activation/cancellation time period has elapsed, if a second peak within 10% allowance of the first peak, for example, is detected, the applied time Tb1 is read out of the memory 12 (Step S-112) so as to extend the activation/cancellation time period by the applied time Tb1 (Step S-113). Then, the passage of the activation/cancellation time period is monitored (Step S-109).

The control/calculation unit 11 determines whether pinching is generated in the window 1 (Step S-110) after the completion of the activation/cancellation time period (Step S-109). If the pinching generation is determined at Step S-110, the required pinch avoiding procedure, such as motor stopping or widow lowering, is executed (Step S-111), and the system is completed after finishing the required pinch avoiding procedure.

Figure 8:
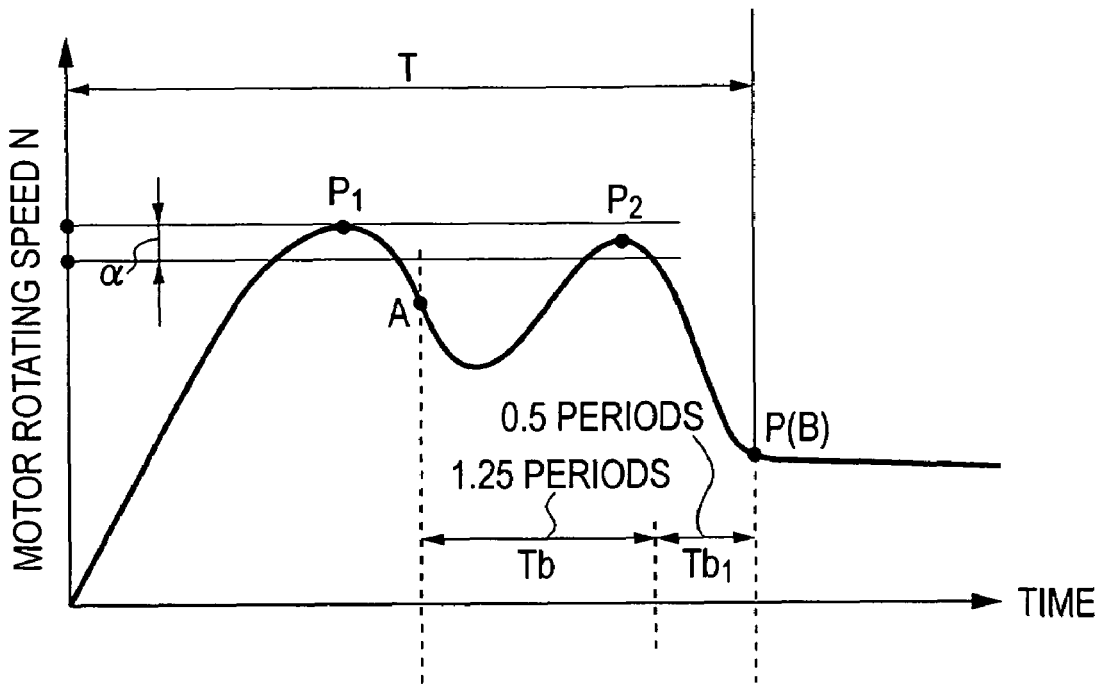
FIG. 8 is a graph showing the effect of the power window apparatus with the pinching detection function according to the second embodiment.

The activation/cancellation time period in the above description will be described with reference to FIGS. 5 and 8. FIG. 5, as mentioned above, shows the activation/cancellation time period when the second peak of the motor rotating speed is not detected or the second peak is less than a predetermined amount. The activation/cancellation time period T is set to have the period obtained by adding the applied time Tb, i.e., 1.25 periods of the door vibration, to the time at A point, i.e., time Ta where the decreasing rate of the motor rotating speed is maximal. The small peak in the drawing shows the peak due to the door vibration, which is not the peak due to the ill-fitted door. The above-description is the same as the procedure according to the first embodiment. FIG. 8 shows the activation/cancellation time period when a second peak with more than a predetermined amount of the motor rotating speed (P2) is detected. The activation/cancellation time period T in this case is set to have the period obtained by further adding 0.5 periods of the door vibration to the activation/cancellation time period T shown in FIG. 5. This procedure is applied to that when after the first peak (P1) is detected, a peak is detected with a allowance on the first peak P1 of the motor rotating speed. Character α is the allowance recognized effective in experimental data statistics. According to the embodiment, α is assumed to be 10%.

In such a manner, even when the motor rotating speed makes its behavior due to ill-fitting of the window, the power window apparatus with the pinching detection function according to the embodiment can establish a suitable activation/cancellation time period.

Figure 4:
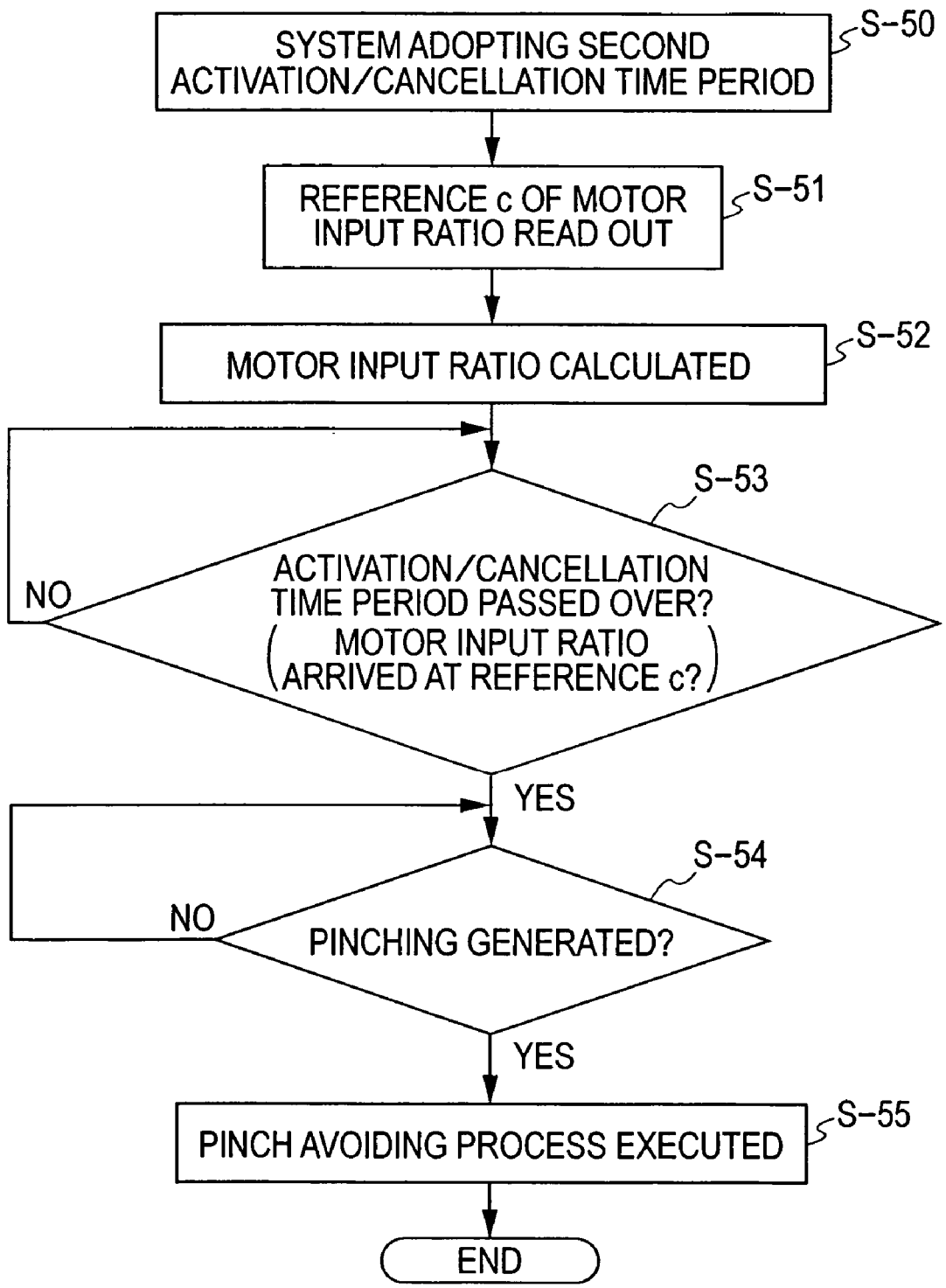

At Step S-103 in FIG. 7, when the peak of the motor rotating speed is not detected during the peak detection, the second activation/cancellation time period is adopted (Step S-50). The procedures after Step S-50 on down are shown in FIG. 4, and have been described in the first embodiment, so that the description is omitted.

Figure 12:
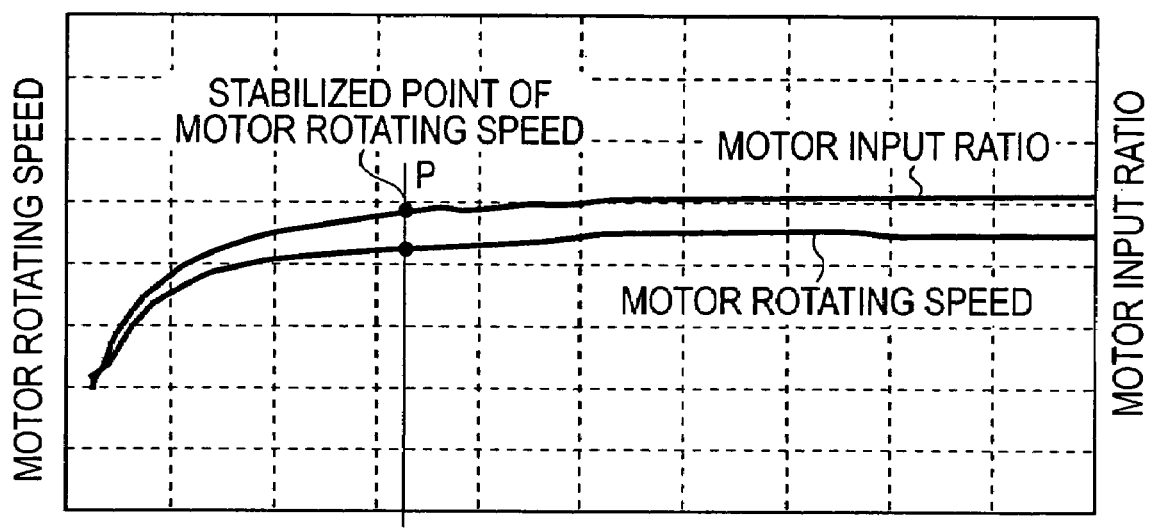
FIG. 12 is a graph showing a motor input ratio and changes in motor rotating speed when the window drive system according to the embodiment has no backlash.

FIG. 12 shows changes in motor rotating speed and motor input ratio from the motor start when the drive system has no backlash. According to the embodiment, the point of the motor input ratio arriving at 97% (reference) is established as the finish time B of the activation/cancellation time period.

In such a manner, in the power window apparatus with the pinching detection function according to the embodiment, when the peak of the motor rotating speed is not detected (there is no backlash of the drive system of the window 1 with more than a predetermined amount), the point of the motor input ratio arriving at a desired value (97%, for example) is assumed to be a stabilized point of the motor input ratio as the finish time B of the activation/cancellation time period, preventing the activation/cancellation time period from being inappropriately set at the motor start. Thereby, the presence of the pinching in the window 1 can be more securely detected, further improving the reliability of the power window apparatus with the pinching detection function.

Figure 9:
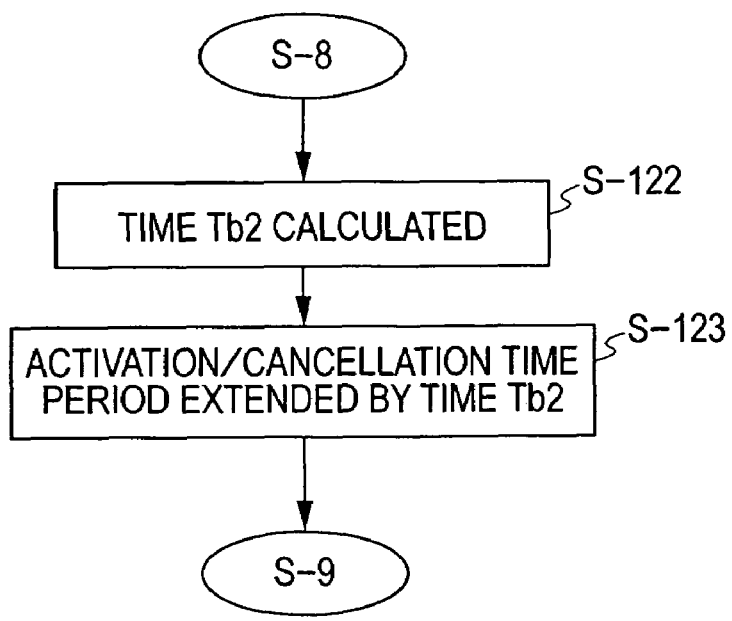
FIG. 9 is a flowchart showing another establishing procedure of an activation/cancellation time period in the power window apparatus with the pinching detection function according to the third embodiment.
Figure 10:
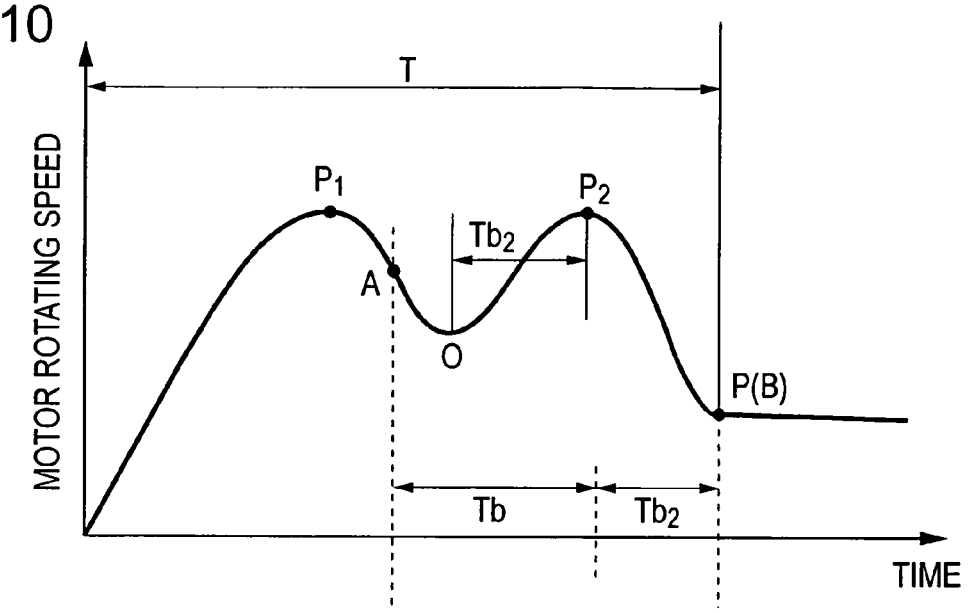
FIG. 10 is a graph showing another example of the effect of the power window apparatus with the pinching detection function according to the first embodiment.
Figure 11A:
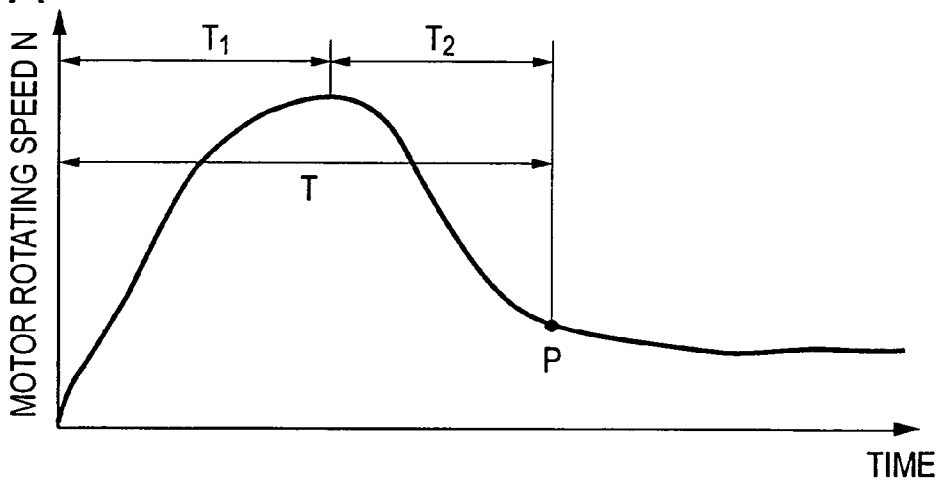
FIGS. 11A and 11B are drawings showing changes in motor rotating speed when the window is lifted.
Figure 11B:
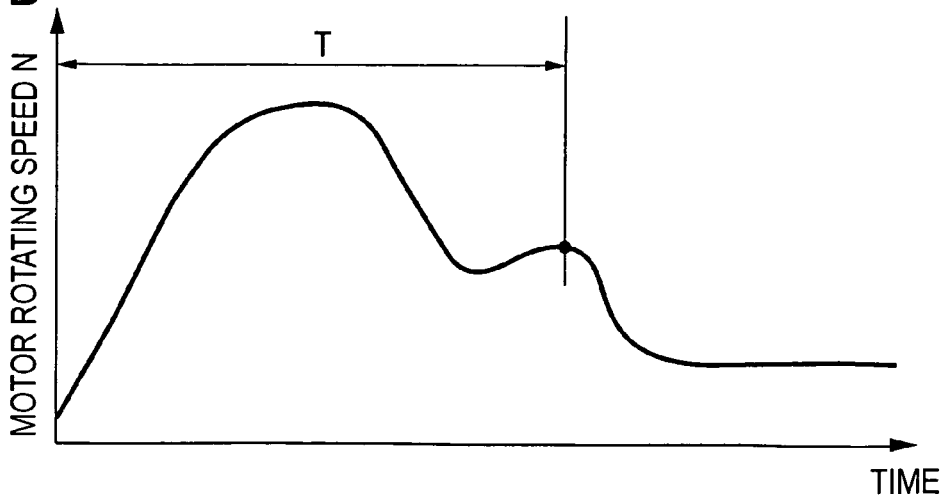

Next, a fourth embodiment of the present invention will be described. The only different point of the fourth embodiment from the embodiments described above is that the setting method of the overtime of the activation/cancellation time period is different when the second peak of the motor rotating speed with more than a predetermined amount is detected. Accordingly, the description about the same part as that of the first embodiment is omitted. FIGS. 9 and 10 are a flowchart and a graph, respectively showing the procedure characteristic to the fourth embodiment. When the second peak of the motor rotating speed with more than a predetermined amount is detected at Step S-108 in FIG. 7 described above, according to the embodiment, the procedure is shifted to Step s-122 in FIG. 9. At Step S-122, the time between the point O in FIG. 10, i.e., the minimal value of the motor rotating speed between the first and second peaks (the point where the decreasing rate of the motor rotating speed is minimal) and the second peak P2 is obtained as an applied time Tb2. Then, at Step S-123, the activation/cancellation time period T is extended by the applied time Tb2. Thereafter, the procedure is shifted to Step S-109 in FIG. 7.

In comparison with the third embodiment, the fourth embodiment is characterized by determining the overtime of the activation/cancellation time period in accordance with the immediately before data of the motor rotating speed. Although the accuracy is slightly better than that in the third embodiment, the computation is slightly complicated.

Next, a fifth embodiment will be described. According to the third embodiment described above, the peak is detected by detecting the motor rotating speed; whereas the fifth embodiment is characterized by sensing the widow lifting force applied to the motor so as to detect the peak. Since other procedures are the same as those of the third embodiment, only "the widow lifting force" is substituted for "the motor rotating speed" in the description of the third embodiment, so that the structural drawing and the procedure drawing are omitted. The widow lifting force has been already described, so that the description is omitted.

Next, a sixth embodiment will be described. According to the fourth embodiment described above, the peak is detected by detecting the motor rotating speed; whereas the sixth embodiment is characterized by sensing the widow lifting force applied to the motor so as to detect the peak. Since other procedures are the same as those of the fourth embodiment, only "the widow lifting force" is substituted for "the motor rotating speed" in the description of the third embodiment, so that the structural drawing and the procedure drawing are omitted. The widow lifting force has been already described, so that the description is omitted.

According to the third to sixth embodiments described above, when the drive system of the window 1 has not a backlash with more than a predetermined amount, the time that the motor input ratio arrives at a required value (97%, for example) is assumed to be the stabilized point of the motor input ratio as the finish time of the activation/cancellation time period T; however, the spirit of the present invention is not limited to this, so that instead of this configuration, when the drive system of the window 1 has not a backlash with more than a predetermined amount, the time that the motor rotating speed changing rate arrives at a required value (97%, for example) may be assumed to be the stabilized point of the motor rotation speed as the finish time of the activation/cancellation time period T.

According to the above-embodiments, Tb is assumed to 1.25 periods of the door vibration; alternatively, on conditions that accuracies in structures of the system are better, one period is possible at minimum. Also, when the accuracy required by the system is low, Tb can be extended to about 1.4 periods from 1.25 periods. Tb1 has been described as 0.5 periods of the door vibration; alternatively, it may be changed in the range from 0.3 to 0.7 in the same way as in the above. After all, using the door vibration period as the reference is attributed to the determination at the appropriate value.

What is claimed is:

1. A power window apparatus with a function of pinching detection comprising:
   a motor for opening/closing a window via a window drive mechanism during driving;
   a pulse generator outputting a pulse signal in accordance with the rotation of the motor;
   a switch unit for manually opening/closing the window by generating a switch signal; and
   a control unit for producing a control signal of the motor corresponding to the pulse signal and the switch signal, the power window apparatus with a function of pinching detection executing:
   determination whether pinching is generated in the window when the window is closed by the switch unit;
   a pinch avoiding procedure when the pinching is determined using the control unit; and
   no pinching determination in the period from a motor start to a stabilized point of the motor rotating speed assumed as an activation/cancellation time period,
   wherein the control unit monitors changes in motor rotating speed from the motor start so as to detect a peak of the motor rotating speed, and when the peak of the motor rotating speed is detected, the control unit measures a period of time Ta, through which the decreasing rate of the motor rotating speed becomes maximal after the peak detection from the motor start, so as to establish the activation/cancellation time period by adding a time Tb that is a first predetermined numerical-fold door vibration period to the time Ta, and
   wherein when the peak of the motor rotating speed is not detected, the time that the changing rate of the motor rotating speed arrives at a predetermined value or an input ratio of the motor arrives at a predetermined value is assumed to be the finish time of the activation/cancellation time period.

2. A power window apparatus with a function of pinching detection comprising:
   a motor for opening/closing a window via a window drive mechanism during driving;
   a pulse generator outputting a pulse signal in accordance with the rotation of the motor;
   a switch unit for manually opening/closing the window by generating a switch signal; and
   a control unit for producing a control signal of the motor corresponding to the pulse signal and the switch signal, the power window apparatus with a function of pinching detection executing:
   determination whether pinching is generated in the window when the window is closed by the switch unit;
   a pinch avoiding procedure when the pinching is determined using the control unit; and
   no pinching determination in the period from a motor start to a stabilized point of the motor rotating speed assumed as an activation/cancellation time period,
   wherein the control unit monitors a window lifting force applied to the motor from the motor start so as to detect a peak of the window lifting force, and when the peak of the window lifting force is detected, the control unit measures a period of time Ta, through which the decreasing rate of the window lifting force becomes maximal after the peak detection from the motor start, so as to establish the activation/cancellation time period by adding a time Tb that is a first predetermined numerical-fold door vibration period to the time Ta, and
   wherein when the peak of the window lifting force is not detected, the time that the changing rate of the window lifting force arrives at a predetermined value or an input ratio of the motor arrives at a predetermined value is assumed to be the finish time of the activation/cancellation time period.

3. A power window apparatus with a function of pinching detection comprising:
- a motor for opening/closing a window via a window drive mechanism during driving;
- a pulse generator outputting a pulse signal in accordance with the rotation of the motor;
- a switch unit for manually opening/closing the window by generating a switch signal; and
- a control unit for producing a control signal of the motor corresponding to the pulse signal and the switch signal, the power window apparatus with a function of pinching detection executing:
- determination whether pinching is generated in the window when the window is closed by the switch unit;
- a pinch avoiding procedure when the pinching is determined using the control unit; and
- no pinching determination in the period from a motor start to a stabilized point of the motor rotating speed assumed as an activation/cancellation time period,
- wherein the control unit monitors changes in motor rotating speed from the motor start so as to detect a peak of the motor rotating speed, and when the peak of the motor rotating speed is detected, the control unit measures a period of time Ta, through which the decreasing rate of the motor rotating speed becomes maximal after the peak detection from the motor start, so as to establish the activation/cancellation time period by adding a time Tb that is a first predetermined numerical-fold door vibration period to the time Ta, and
- wherein when a second peak with more than a predetermined amount of the motor rotating speed is detected thereafter, the activation/cancellation time period is established by adding a time Tb1 that is a second predetermined numerical-fold door vibration period to the activation/cancellation time period obtained before.

4. A power window apparatus with a function of pinching detection comprising:
- a motor for opening/closing a window via a window drive mechanism during driving;
- a pulse generator outputting a pulse signal in accordance with the rotation of the motor;
- a switch unit for manually opening/closing the window by generating a switch signal; and
- a control unit for producing a control signal of the motor corresponding to the pulse signal and the switch signal, the power window apparatus with a function of pinching detection executing:
- determination whether pinching is generated in the window when the window is closed by the switch unit;
- a pinch avoiding procedure when the pinching is determined using the control unit; and
- no pinching determination in the period from a motor start to a stabilized point of the motor rotating speed assumed as an activation/cancellation time period,
- wherein the control unit monitors changes in motor rotating speed from the motor start so as to detect a peak of the motor rotating speed, and when the peak of the motor rotating speed is detected, the control unit measures a period of time Ta, through which the decreasing rate of the motor rotating speed becomes maximal after the peak detection from the motor start, so as to establish the activation/cancellation time period by adding a time Tb that is a first predetermined numerical-fold door vibration period to the time Ta, and
- wherein when a second peak with more than a predetermined amount of the motor rotating speed is detected thereafter, a period of time Tb2 from the time, at which the motor rotating speed is minimized in between the first and second peaks, to the time arriving at the second peak is obtained, so that the activation/cancellation time period is established by adding the time Tb2 to the activation/cancellation time period obtained before.

5. A power window apparatus with a function of pinching detection comprising:
- a motor for opening/closing a window via a window drive mechanism during driving;
- a pulse generator outputting a pulse signal in accordance with the rotation of the motor;
- a switch unit for manually opening/closing the window by generating a switch signal; and
- a control unit for producing a control signal of the motor corresponding to the pulse signal and the switch signal, the power window apparatus with a function of pinching detection executing:
- determination whether pinching is generated in the window when the window is closed by the switch unit;
- a pinch avoiding procedure when the pinching is determined using the control unit; and
- no pinching determination in the period from a motor start to a stabilized point of the motor rotating speed assumed as an activation/cancellation time period,
- wherein the control unit monitors changes in window lifting force applied to the motor from the motor start so as to detect a peak of the window lifting force, and when the peak of the window lifting force is detected, the control unit measures a period of time Ta, through which the decreasing rate of the window lifting force becomes maximal after the peak detection from the motor start, so as to establish the activation/cancellation time period by adding a time Tb that is a first predetermined numerical-fold door vibration period to the time Ta, and
- wherein when a second peak with more than a predetermined amount of the window lifting force is detected thereafter, the activation/cancellation time period is established by adding a time Tb1 that is a second predetermined numerical-fold door vibration period to the activation/cancellation time period obtained before.

6. A power window apparatus with a function of pinching detection comprising:
- a motor for opening/closing a window via a window drive mechanism during driving;
- a pulse generator outputting a pulse signal in accordance with the rotation of the motor;
- a switch unit for manually opening/closing the window by generating a switch signal; and
- a control unit for producing a control signal of the motor corresponding to the pulse signal and the switch signal, the power window apparatus with a function of pinching detection executing:
- determination whether pinching is generated in the window when the window is closed by the switch unit;
- a pinch avoiding procedure when the pinching is determined using the control unit; and
- no pinching determination in the period from a motor start to a stabilized point of the motor rotating speed assumed as an activation/cancellation time period,
- wherein the control unit monitors changes in window lifting force applied to the motor from the motor start so as to detect a peak of the window lifting force, and when the peak of the window lifting force is detected, the control unit measures a period of time Ta, through which the decreasing rate of the window lifting force becomes maximal after the peak detection from the motor start, so as to establish the activation/cancellation time period by adding a time Tb that is a first predetermined numerical-fold door vibration period to the time Ta, and wherein when a second peak with more than a predetermined amount of the window lifting force is detected thereafter, a period of time Tb2 from the time, at which the motor rotating speed is minimized in between the first and second peaks, to the time arriving at the second peak is obtained, so that the activation/cancellation time period is established by adding the time Tb2 to the activation/cancellation time period obtained before.

* * * * *